United States Patent [19]

Barthalon et al.

[11] 4,017,001
[45] Apr. 12, 1977

[54] ELECTROMAGNETIC SYSTEM FOR PROPULSION AND PROGRAMMED POSITIONING

[75] Inventors: Maurice Barthalon, Verrieres; Andre Subtil, Venissieux, both of France

[73] Assignee: Maurice Barthalon, Verrieres, France

[22] Filed: Sept. 29, 1975

[21] Appl. No.: 617,728

[30] Foreign Application Priority Data

Jan. 10, 1975  Luxembourg ............................ 71614

[52] U.S. Cl. .................................... 221/5; 221/129
[51] Int. Cl.² .......................................... B65G 1/10
[58] Field of Search ................ 221/5, 13, 125, 129, 221/268, 87, 88; 214/16.4 A

[56] References Cited

UNITED STATES PATENTS 3,313,449   4/1967   Parks .............................. 221/129 X
3,802,581   4/1944   Frederick ......................... 221/13 X Primary Examiner—Stanley H. Tollberg
Attorney, Agent, or Firm—Young & Thompson

[57] ABSTRACT

A system for carrying out the controlled displacement of objects comprises a propulsion device constituted by a magnetizing assembly and a magnetized assembly which are capable of relative motion and one of which is connected to an object container while the other is connected to an object-withdrawal device. Power is supplied in the form of a sequence of unidirectional pulses fed to the inductance windings of the magnetizing assembly, the sequence being controlled by a program comprising a series of whole numbers of pulses. Each whole number corresponds to one stationary position of the system so as to place the object-withdrawal device opposite to the stored object.

54 Claims, 20 Drawing Figures

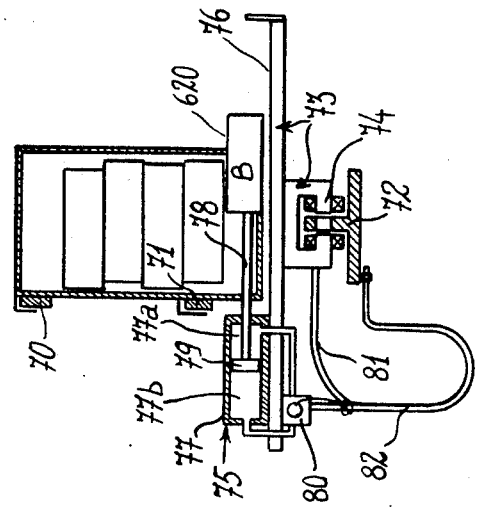
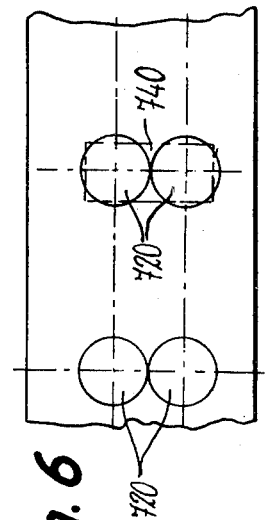
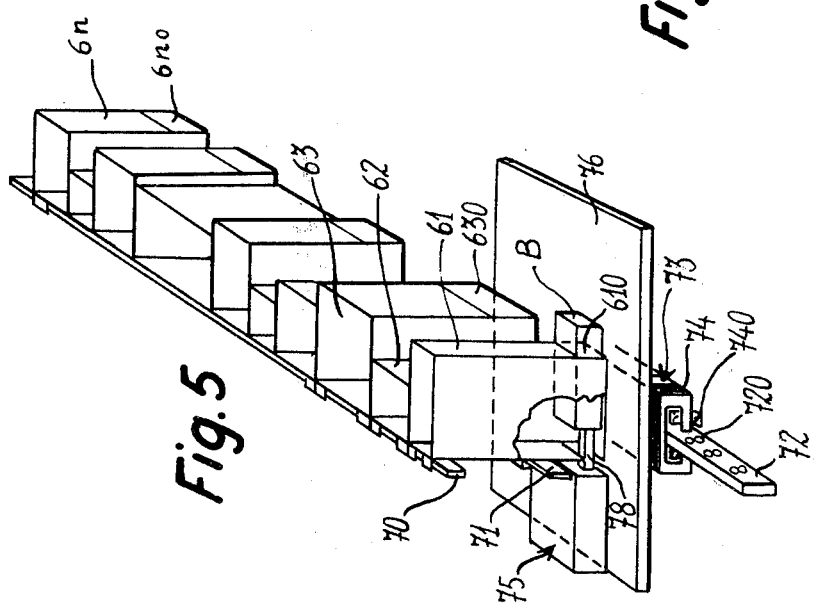

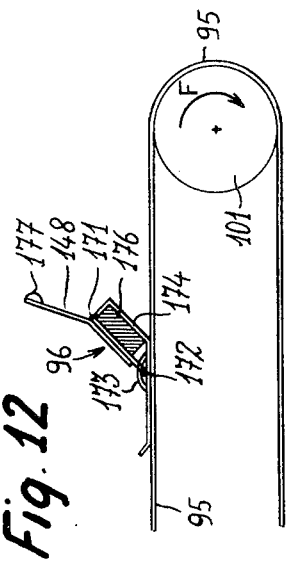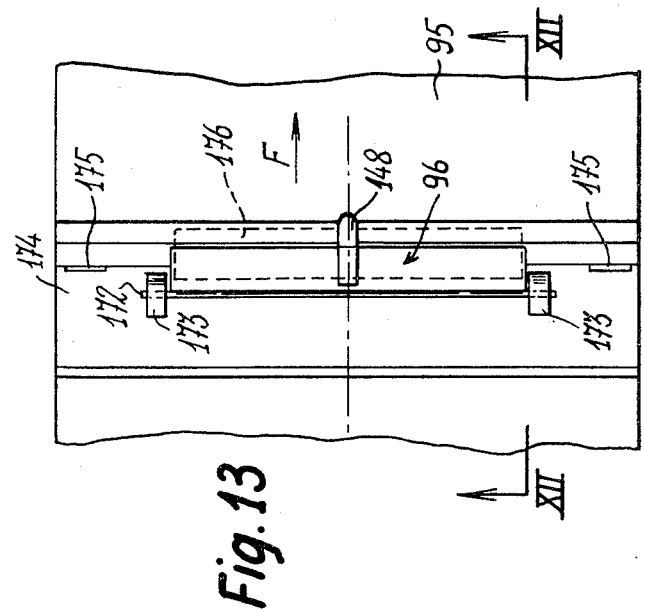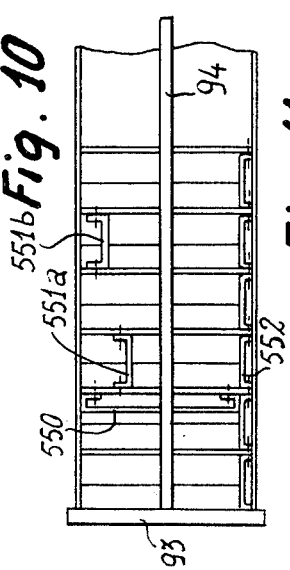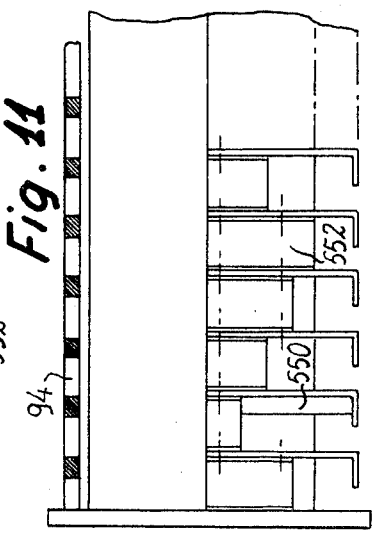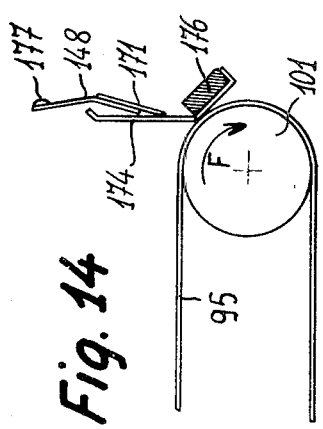

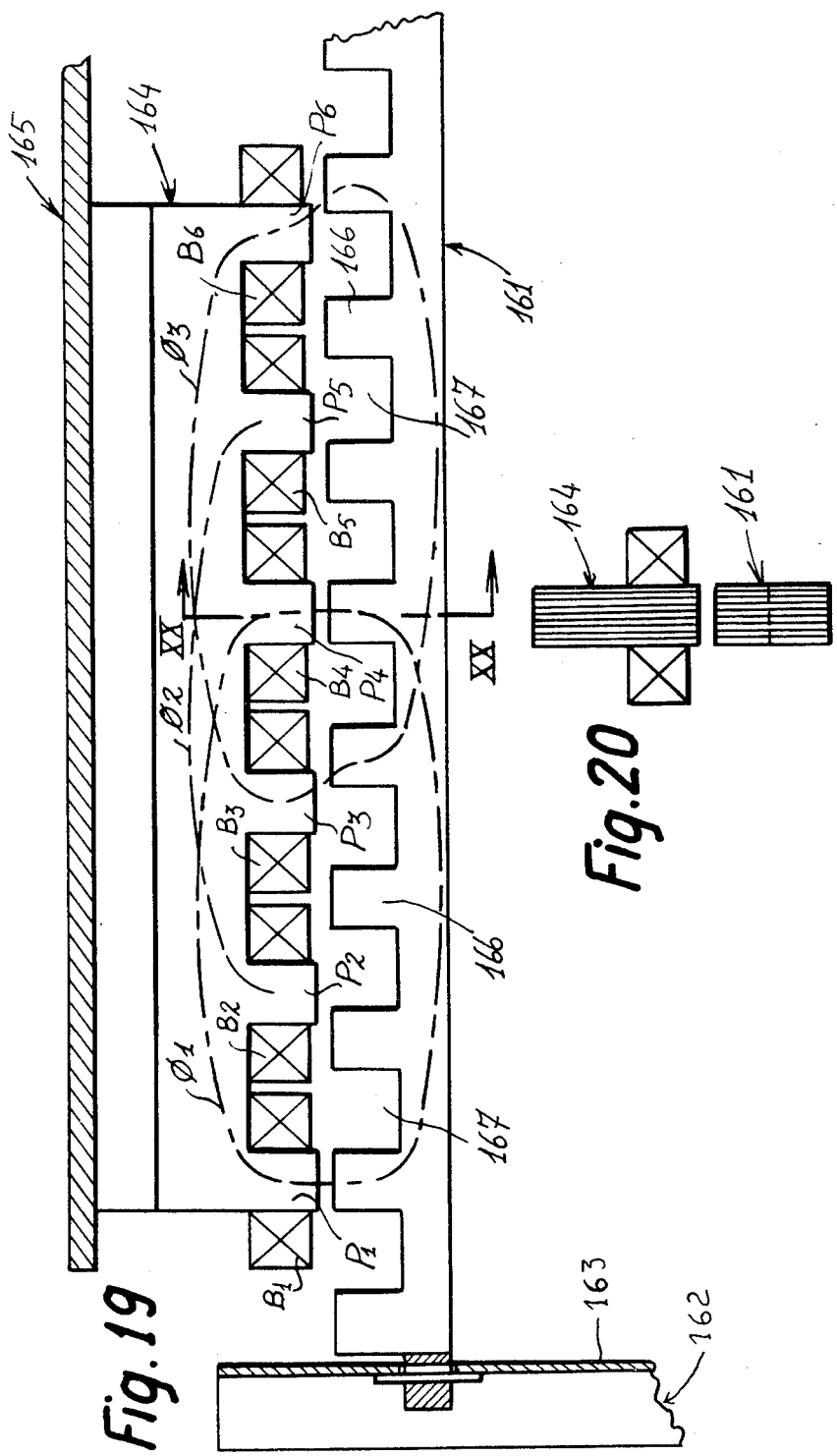

ELECTROMAGNETIC SYSTEM FOR PROPULSION AND PROGRAMMED POSITIONING

This invention relates to an electromagnetic system for propulsion and programmed positioning which is intended to carry out the displacement of objects according to requirements and the control of said displacements.

Systems have already been employed in the prior art for moving objects stored in vertical or horizontal rows which are placed in containers. Systems of this type comprise a linear induction motor which initiates the displacement of the containers and/or the drawers which carry the containers as well as means for finally withdrawing the objects from the containers and transferring these latter, said means being constituted by belt conveyors, for example.

However, all these devices provide only imperfect answers to the problem of displacement of objects since it proves impossible in practice to control with any degree of accuracy either the position, speed or acceleration of the moving elements without jerks and without making use of complex devices for position-locating and operational control with regulating loops. Devices of this type also fail to provide any solution to the problem of data-processing control of such displacements.

Electromagnetic linear motors are also known, especially those described in U.S. Pat. No. 3,225,228 and in French Pat. No. 1,592,065, but these documents contain only those elements of information which are necessary for the construction of such motors and do not describe devices for solving the problem with which the present invention is concerned.

One of the aims of this invention is to provide an electromagnetic system for propulsion and programmed positioning and to achieve by means of this system the degree of precision which is essential in order to ensure coincidence of the container and the object-withdrawal device, thus in turn ensuring correct discharge of said object.

In accordance with the invention, the electromagnetic system for propulsion and programmed positioning for carrying out the displacement of objects in accordance with requirements and especially of objects stored in categories in respective containers and the control of said displacements comprises a propulsion device formed by a magnetizing assembly and by a magnetized assembly which are capable of moving with respect to each other. The magnetizing assembly is provided with at least one uniform row of N magnetic circuits fitted with inductance windings and having N poles or pairs of poles; the magnetized assembly is provided with at least one uniform row of N' magnetic cores separated by non-magnetic sections and having a pitch which is different from that of the magnetic circuits. Said system further comprises a device for supplying electric power to the inductance windings in the form of a sequence of unidirectional electric pulses fed successively to said windings, and is distinguished by the fact that the ratio of pitch of circuits to pitch of cores is equal to: $(Kn \pm 1)/(n)$, where $K$ and $n$ are whole numbers, that one of the two assemblies of the propulsion system is connected to a container which contains at least one object and the other assembly is connected to a device for withdrawing the object from the container, and that said system comprises an electronic device for the programmable control of said sequence. The program comprises a series of whole numbers of pulses such that each whole number corresponds to one stationary position of the propulsion and programmed-positioning device for placing the object-withdrawal device in oppositely-facing relation to the stored object which is intended to be withdrawn.

It is apparent that the rows of magnetic circuits and of cores constitute a very precise space scale which produces in addition a Vernier effect by reason of the relative pitches of the magnetic assembly and of the magnetized assembly.

At the same time, the train of programmed pulses in the form of a series of whole numbers results in a highly accurate time scale which makes it possible in conjunction with the rows of circuits to achieve simultaneous control of time and space and therefore to achieve the aim of the invention as set forth in the foregoing.

The aforementioned means of the invention also serve to ensure the necessary accurate control of both position and speed in order to ensure rapid and jerk-free displacement over a period which is subject to very little variation according to the distance of displacement, at least in some applications, and in order to permit of synchronization with the object-withdrawal devices, namely the extraction and discharge devices, this result being achieved without making use of detectors and complex regulating loops.

The invention further provides a system for propulsion and programmed positioning which makes it possible to effect the storage of a large number of different products which are themselves of greater or lesser number in each category, the automatic distribution of these products, the automated control of the stock, the semi-automatic replenishment of stored products, the required adaptation of the storage volume to new packaging of said products, to new products or again to the variable "rotation" of such products.

In accordance with a preferred embodiment, the series of whole numbers is such that the difference between two consecutive whole numbers is not constant, thus making it possible to obtain stationary positions having a pitch which is not constant.

In accordance with an advantageous embodiment of the invention, the relative unitary displacement corresponding to one pulse (namely the pitch of the magnetic masses divided by the number N of supply of circuits or conversely) is substantially smaller than the dimension along the axis of the movement of the chamber which contains the smallest object to be transported and is even preferably comprised between one-quarter and one-twentieth of said dimension.

The result thereby achieved is a very high degree of accuracy of the stationary position and at the same time a high specific power of the transport system.

In accordance with one advantageous application of the invention, the container constitutes a device for storing objects in a row, thus permitting the construction of particularly economical automated stockrooms.

In accordance with another improved embodiment, the series of whole numbers aforesaid is modifiable by means of a device providing access to a memory which is included in the programming device.

The stationary positions can accordingly be modified at will, thus making it possible to store sets of different objects in the same space at different times.

In accordance with yet another important improvement, the object-withdrawal device comprises means for displacing the objects in order to extract them from the container and depositing them at a point located outside the system.

Preferably, the object-withdrawal device is provided with means for checking the withdrawal of the object and in a general manner with means for providing a connection with a data-processing system so arranged as to perform operations for the control of displacements and stocks.

Finally and in accordance with another mode of application, the container is the cabin of a transportation system of the elevator type or a horizontal personnel transporter (of the type designated by the initials PRT ("Personal Rapid Transit)" or by the name of Duomode). All the problems involved in programmed positioning of these systems are thus solved in a particularly elegant manner.

Further properties and advantages of the invention will become apparent from the following description, reference being made to the accompanying drawings which are given by way of illustration but not in any sense by way of limitation, and in which:

FIG. 5 is a view in perspective showing the system incorporated in a device for storage in vertical stacks comprising containers, in which the linear motor for displacing the extractor also performs the function of displacement of object;

FIG. 6 is a detail view of FIG. 5 to a larger scale;

FIG. 7 is a transverse sectional view of the device shown in FIG. 5;

FIGS. 10 and 11 are respectively a top view and a side view showing a system which is similar to that of FIG. 8 and showing two details of that portion of the object-withdrawal device which is connected to the container;

FIGS. 12, 13 and 14 show details of that portion of the object-withdrawal device of FIG. 8 which cooperates with the container;

FIG. 19 is a longitudinal sectional view of an alternative form of construction of the propulsion device;

FIG. 20 is a sectional view taken along line XX—XX of FIG. 19.

Figure 1:
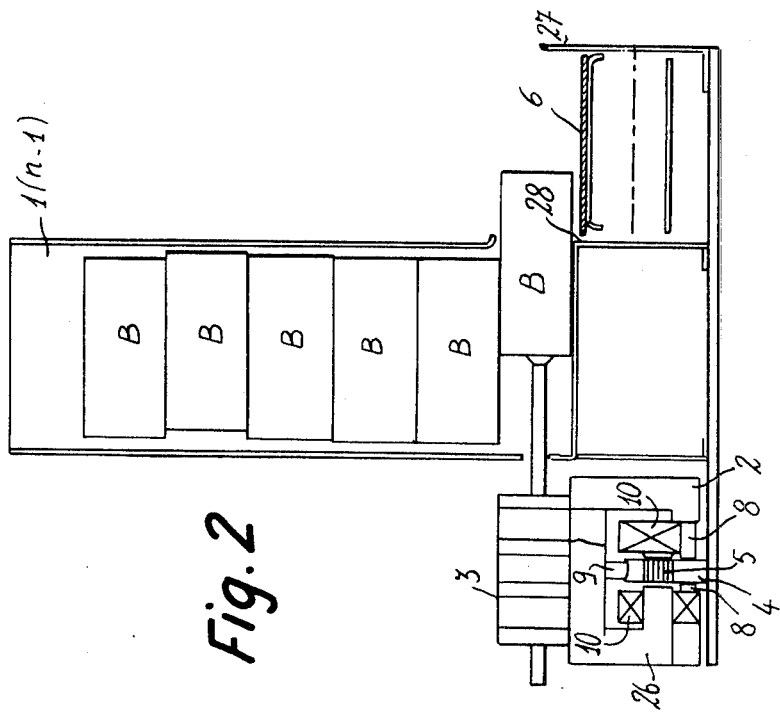
FIG. 1 is a view in perspective showing one example of the system incorporated in an automatic storage and distribution unit with vertical storage compartments.

Referring first to Fig. 1, the system according to the invention essentially comprises a row of compartments as designated by the reference 1 which form the storage section, an electromagnetic linear motor in which the moving portion 2 carries a movable withdrawal device comprising an extractor 3. The movable portion 2 of the electromagnetic device for propulsion and programmed positioning is constituted by magnetizing circuits and is guided by the stationary portion 4 of the system which carries magnetic cores 5.

A conveyor belt 6 receives the objects which are ejected from the container 1 through openings such as those designated by the references 11, 12 . . . 1n, said openings being formed at the bottom of the front face 20 of the container.

A stack of identical objects is intended to be placed by hand within each compartment 11, 12 and so forth of the storage volume 1. The objects are therefore identical within each compartment so as to ensure correspondence of at least one address in the case of one type of object. In the most simple case, the address can be the number of the compartment.

FIG. 1 also shows a control unit 21 carrying an alphanumeric keyboard 22 which is connected to the moving portion of the linear motor by means of a rigid wire connection 23 and a flexible wire connection 24.

The control unit carries a push-button 25 which gives the start-up order. The operation is as follows: since the address of the object to be extracted is known (for example the compartment designated by the number of the opening 12), it is only necessary to strike the number 12 on the keyboard and to give the start-up order by depressing the push-button 25. The distribution process regulated by a logic circuit integrated with the control unit is then initiated.

The moving portion 2 of the motor displaces an extractor 3 which is stopped behind the compartment corresponding to the opening 12, for example. The extractor 3 thrusts the package B onto the conveyor belt 6, whereupon the ejector 3 again withdraws, the logic circuit initiates transfer of the conveyor belt 6 which travels over a distance at least equal to the length of the storage volume in order to bring the most distant object (for example the object derived from the compartment 1n) to the exterior of the storage and distribution unit.

Figure 2:
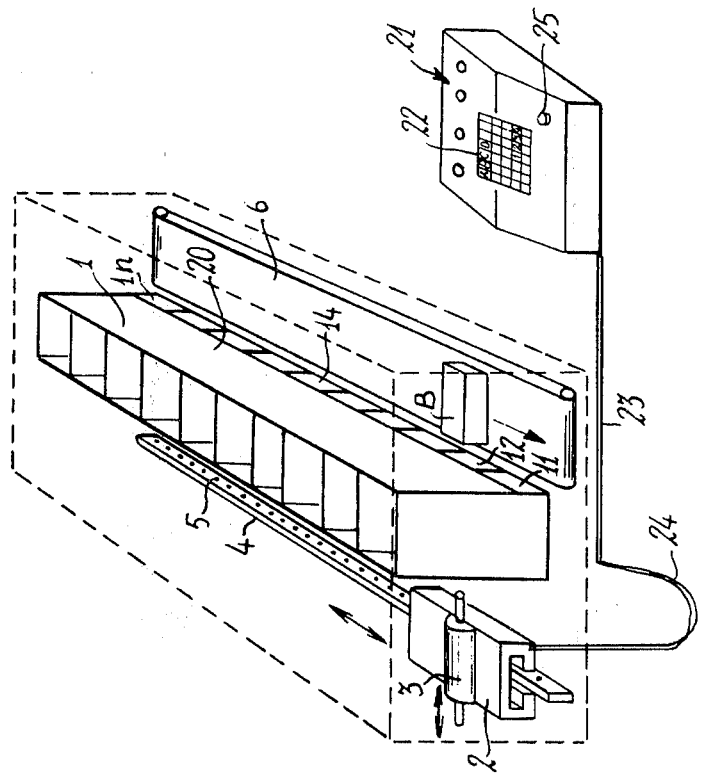
FIG. 2 is a transverse sectional view of the device shown in FIG. 1.

FIG. 2 shows in transverse cross-section the arrangement of the means presented in FIG. 1, at the level of the compartment corresponding to the ejection opening 1 (n-1). There can be seen in particular: the cross-section of one compartment of the storage volume 1 containing a stack of packaged objects B, the extractor 3 of the linear electric motor type in the position of ejection of mid-travel and the lowermost object B of the stack as said object is being withdrawn through the opening 1 (n-1) above the conveyor belt 6 which is placed between two object guides 27 and 28.

There is also shown in FIG. 2 a magnetizing circuit 26 of the propulsion system, said circuit being carried by the system shown in cross-section at the level of a magnetic core 5.

The magnetizing circuit 26 carries two coils 10 which are placed as close as possible to the poles. The moving portion of the propulsion system 2 is guided by shoes 8 and supported by shoes 9 formed of material having a low coefficient of friction such as polytetrafluoroethylene, for example. Said shoes ensure contact with the stationary portion 4 of the motor.

Figure 3:
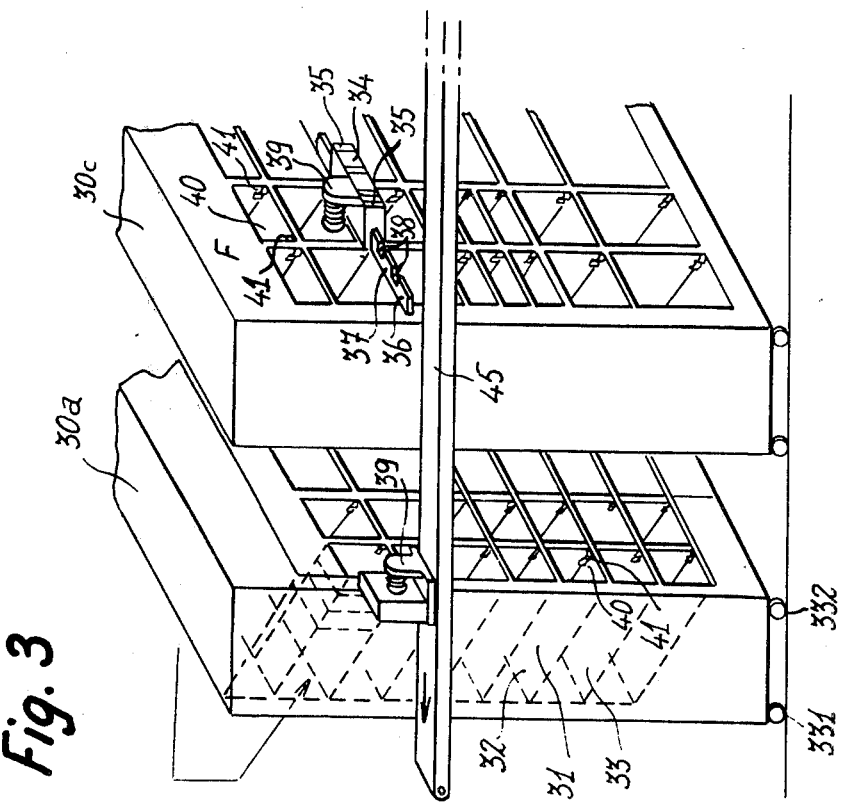
FIG. 3 is a view in perspective showing one embodiment of the system in the case of an automatic storage and distribution unit with inclined storage compartments.

FIG. 3 shows in perspective another embodiment of the system according to the invention in which is shown a number of storage volumes 30 placed in parallel relation. Each storage volume as designated by the reference 30a is provided with compartments such as 31 having parallel walls in which the bottom wall 32 of one compartment constitutes the top wall of the adjacent compartment 33 located immediately beneath, for example. As an advantageous feature, each storage volume can be displaced on runner-wheels such as those designated by the references 331, 332 and so forth.

The moving portion of the propulsion device forms a carriage 34 which is constituted by magnetizing circuits 35 and is carried and guided on the stationary portion 36 of the motor. The stationary portion 36 is a flat rule formed of magnetic material such as a light alloy (aluminum, for example) which forms rectangular teeth 37. Magnetic cores 38 are inserted in the recesses formed between the teeth 37.

Figure 4:
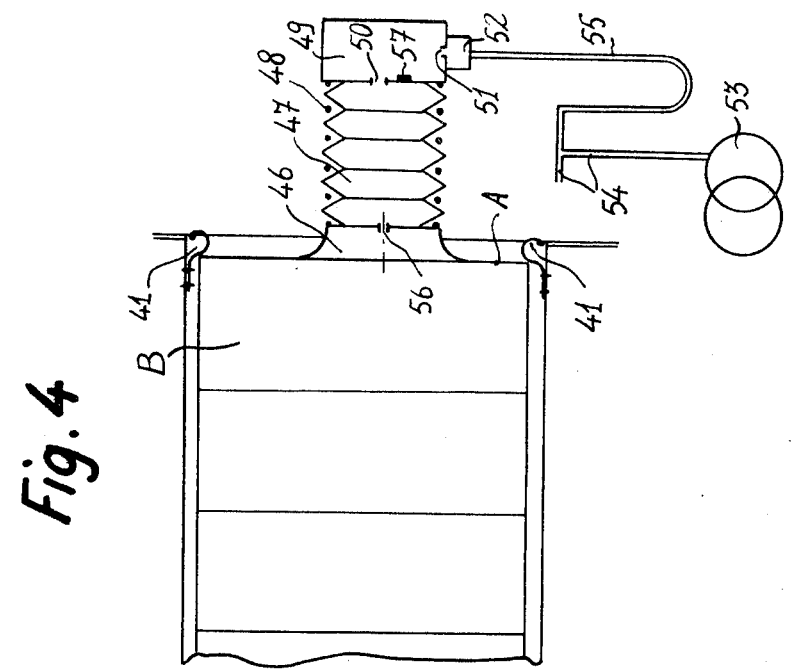
FIG. 4 is a detail view of the gripping device of the extractor shown in FIG. 3.

There is also shown in FIG. 3 an object-withdrawal device which is carried by the moving portion of the propulsion system and comprises an extractor 39, a more detailed form of construction of which is shown by way of example in FIG. 4. The complete propulsion device, the stationary portions such as 36 of the propulsion device and a conveyor belt 45 which is assigned to all the storage volumes hereinabove defined can be dislaced in vertical motion by any suitable means (not shown) so that all the extractors such as the extractor 39 can always be placed at the level of the openings of the different compartments. Each compartment such as 31 is provided on its lateral faces and within the interior with resilient stops such as the stop 41. The arrangements described in the foregoing are particularly applicable to a large storage volume comprising a large number of classes of objects which in turn consist of a limited number of elements and when the distribution frequency is of low or moderate value.

FIG. 4 shows the carriage 34 equipped with an extractor 39 which is in turn constituted by a suction element 46 placed against a bellows 47 to which tension is applied by a spring 48. The suction element 46 communicates with the bellows 47 by means of an opening 56.

The bellows 47 is secured to an enclosure 49 and communicates with this latter by means of an opening 50.

The ratio of cross-sections of the openings 56 and 50 is equal to the ratio of the volume of the bellows 47 in extension to the volume of the suction element 46 and it is preferably ensured that the cross-section of the opening 50 is at least four times larger than that of the opening 56.

The enclosure 49 has a second opening 51 to which is connected an electrovalve 52.

Each carriage such as the carriage 34 carries an assembly of this type and the electrovalves such as 52 are connected to a vacuum pump 53 by means of a piping system 54 in which at least a flexible portion 55 is connected to each electrovalve such as 52.

The operation is as follows: when the start-up order is given by a device which is similar to that shown in FIG. 1, the carriage 34 is displaced by the propulsion device to the address of the object requested. During this time interval, the vacuum pump produces a partial vacuum within the bellows 47 via the electrovalve 52 which is open. Since the carriage is stationary, the electrovalve closes, atmospheric pressure is progressively established through the opening 56 formed at the end of the bellows and of the suction element. The spring 48 then thrusts the suction element forward and said element is applied against the face A of the object B. After a predetermined time interval within the control logic unit, the electrovalve 52 is again opened, thus creating a partial vacuum within the bellows and the suction element which adheres to the object. The partial vacuum then attains a value such that the force of pneumatic attraction exceeds the force applied by the spring 48 and the stops 41 which are provided for this particular compartment. The object B is then progressively extracted from the compartment by total contraction of the bellows and the end of travel is detected on a microswitch 57. The order of displacement of the carriage 34 is then given so as to discharge the object to the conveyor belt 45.

Provision is made for adjusting the normal negative pressure to a predetermined value in order to enable the suction element to become detached if an object remains jammed within its compartment. An effort-limiting device having an adjustable limit is thus provided.

FIG. 5 shows in perspective another embodiment of the invention in which the storage volume is constituted by a row of containers such as those designated by the references 61, 62, 63 and so forth, said containers being supported by a structure which mainly comprises two cross-bars 70 and 71. The containers 61, 62 and so forth all have the same height; on the other hand, the widths and the depths can be very different and adapted to the dimensions of the objects to be stored. In particular, each container has an opening 610, 620 and so forth having dimensions which are slightly larger than the package B of the objects of the stack contained therein.

There is also shown in FIG. 5 the stationary portion 72 of the electromagnetic propulsion device and a moving carriage 73 which is mainly constituted by magnetizing circuits such as 74. Said carriage is self-guided on the stationary portion 72 and adapted to carry an extracting device 75 and a conveying plate 76.

FIG. 6 is a detail view showing a particularly advantageous construction of the magnetic cores. The magnetizable masses are composed of at least one core having the shape of a regular cylinder such as the core 720 having generator-lines at right angles to the direction of displacement. The theoretical rectangular shape of the pole is shown in chain-dotted lines. This technological arrangement is particularly economical.

FIG. 7 shows in transverse cross-section the same device as that of FIG. 5 and provides an even clearer illustration of the plate 76 and the extractor 75 in action at the mid-point of travel. In this case, the extractor is a double-acting jack 77, the operating rod 78 of which constitutes the push-rod having a constant travel which is slightly longer than the maximum permissible depth of the containers and carries a piston 79.

An electrovalve 80 is supplied on the one hand with electric power by the cable of the general supply wiring 81 of the linear motor and on the other hand with compressed air from a pressure supply network by means of a flexible pipe 82 which feeds the jack on each side of the piston.

The operation of the system shown in FIGS. 5 and 7 is as follows: starting from the start-up order given by a control unit which is not illustrated but is similar to the device 21 of FIG. 2, the carriage 73 is transferred to the address of the object requested and held in position at that location by maintaining the current within any one of the magnetizing circuits such as the circuit 74. The control unit reverses the supply to the jack which had previously maintained the pressure within the chamber 77a of the jack 77, thus withdrawing the operating rod 78 within the interior of the jack; the pressure reversal which then takes place at 77b initiates the ejection of the object B from the corresponding compartment to the position defined by the linear motor through the opening of the container such as the opening 620, for example. The object thus displaced is accordingly deposited on the conveying plate 76. After ejection, the control logic circuit again reverses the position of the electrovalve 80, the jack rod 78 then withdraws, the propulsion device is again put into operation and brings the object to the end of the storage unit, whereupon a suitable gripping and transporting device initiates transfer of the object.

Figure 8:
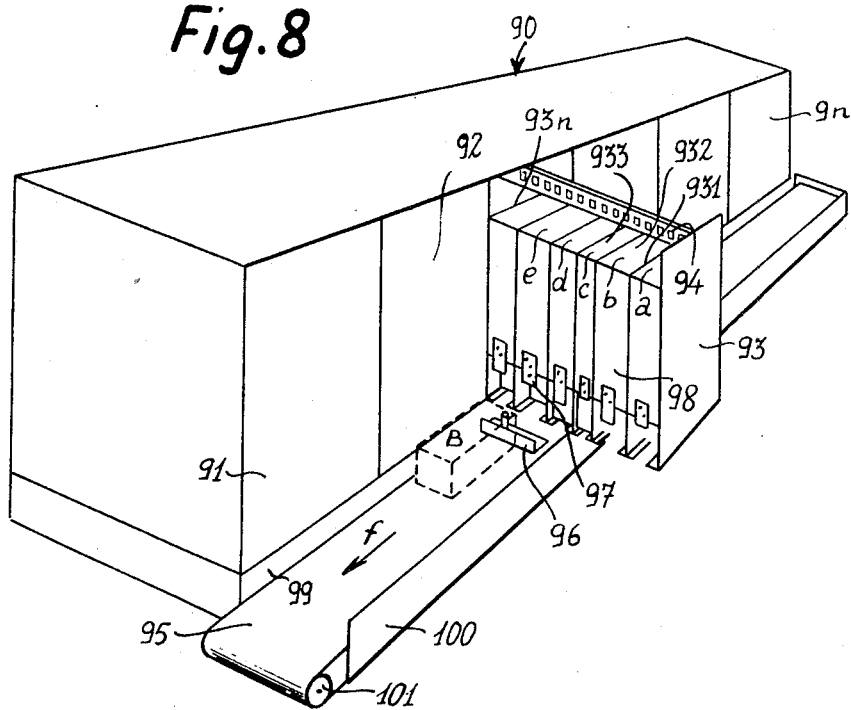
FIG. 8 is a view in perspective showing another embodiment of the system according to the invention in which the extraction means is carried by a conveyor belt and in which the container is movable.
Figure 9:
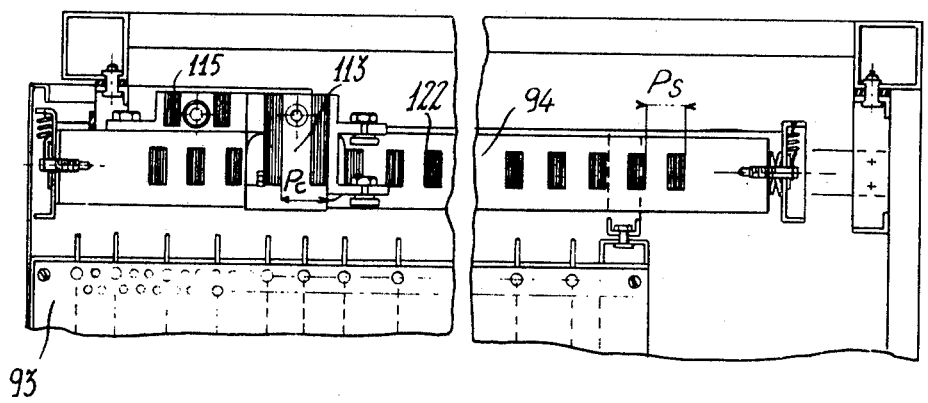
FIG. 9 is a fragmentary view to a larger scale and showing the same embodiment, this view being taken along a plane parallel to the direction of travel of the container.

FIG. 8 is a perspective view showing a further embodiment of the invention in which a module 90 comprises movable container 91, 92, 93 ... 9n. Each module is divided into compartments. For example, the container 93 comprises compartments a, b, c and so forth which are defined by partition-walls 931, 932, 933 and so forth, said partition-walls being positionally displaceable by hand in order to permit adaptation of the depths of the compartments to packages or boxes having different dimensions. Said compartments contain stacks of identical objects within each compartment. Each movable container is propelled by means of a propulsion device in which the moving portion 94 is connected to the container 93 (as shown in FIG. 9). Characteristic features of this propulsion device will be described hereinafter.

There is also shown in FIG. 8 the object-withdrawal device constituted by a conveyor belt 95 fitted with an extractor 96 which is so designed as to ensure that the packaged object B withdrawn from the compartment C is thrust through the opening formed in the lateral wall of the container. All the compartments such as a, b, c and so forth are provided with an opening of this type in which the vertical dimension is adjusted by means of a shutter as designated by the reference 97, the width of which is either equal to or smaller than that of the narrowest compartment and which is in turn fixed on the lateral face 98. The shutter 97 forms a stop for the object placed immediately above the one which is in the ejection stage.

The conveyor belt 95 is placed between two stationary guides 99 and 100 which have the intended function of guiding the objects conveyed by the belt 95 (in the direction of displacement defined in FIG. 8 by the arrow f) said conveyor belt being actuated by a drive roller 101.

Attention is drawn to the particular arrangement in accordance with the invention of the magnetic cores 122 in which the distance Ps between two adjacent cores is different from the distance between the poles Pc of two consecutive magnetizing circuits 115; there exists a special relation between Ps and Pc such that:

$$Pc/Ps = (Kn \pm 1)/(n)$$

where K is a whole number and n is the number of circuits. In the embodiment shown in FIG. 9, K is equal to 1 and n is equal to 4.

The motor must be supplied with voltages which are displaced in phase by $2\pi/m$, where m corresponds to the number of groups of magnetizing circuits which are supplied in phase. In the case of FIG. 8, four phases contained in the network of connections supply four groups each comprising a single magnetizing circuit ($m = 1$).

The foregoing description serves to show that the definition of relative position between the stationary portion of the propulsion device 113 and the moving portion 94, and therefore the definition of displacement of the container 93 relative to the extractor 96, is equal to the pitch of the cores divided by the number of groups of magnetizing circuits which is equal in the particular case of FIG. 9 to the number of magnetizing circuits, namely four.

Further particular features of construction are brought out by the embodiments considered hereinafter and will serve to describe the operation of the system in more precise detail.

FIGS. 10 and 11 are respectively a top view and a side view showing another mode of arrangement of the drawers.

In this case, the separations forming compartments are equidistant and an assembly of spacer members 550 makes it possible to adjust the width of the compartment to the width of the object to be stored.

Moreover, another assembly of braces 551a, 551b serves to adjust the length of the compartment to the length of the object to be stored.

Similar design solutions comprising braces or spacer members for adjusting the dimensions of the compartments to the dimensions of the object can be applied to all the systems described in the foregoing even if the compartments are initially not equidistant.

There are also shown in FIG. 11 shutters 552 for adjusting the extraction opening according to the height of the object stored in order to ensure extraction of only one object at a time.

Preferably, the widths of the container-drawers 93 (shown in FIG. 8) are in the ratio 1, 2, 3, which in fact corresponds to usual length ratios in the case of boxes for the packaging of products and permits at the same time a large number of associations of containers in a standardized width.

It will also be noted that the modules are equipped with devices for stacking these latter in tiers and assembling them in modules of variable size.

FIGS. 12 and 13 are two views respectively in transverse cross-section and in plan showing one embodiment of the extracting device 96 in accordance with the invention as already described briefly with reference to FIGS. 8 and 9.

Said device comprises a resilient push-rod 148 which is advantageously formed of spring steel fixed on a magnetic plate 171 which in turn forms a flap pivotally mounted on a pin 172 within recesses 173 forming part of the support plate 174. The push-rod 148 is adapted to carry a stop 177.

The support plate 174 is joined by means of clips 175 to the conveyor belt 95 along a transverse generator-line of said belt, the end portion of which is shown in FIG. 12. The plate 174 is folded forwards in the direction of travel of the conveyor belt as defined by the arrow F. A permanent magnet 176 is bonded to the plate 174 in such a manner as to ensure that the active face of this latter is parallel and in contact with the flap 171 when this latter is inclined in the forward direction, which is the normal position for extraction of an object or a box from a compartment.

The operation of the device is as follows: when the push-rod 148 comes into contact with the object by means of the stop 177, the resilient push-rod 148 is progressively inclined to the rear until the resilient force attains a value equal to or greater than the friction force which maintains the object within the compartment. Taking into account the very small mass of the push-rod 148 and taking into account the elasticity of the device, there is therefore not any impact between the extractor and the object but a progressive increase in the effort applied.

Furthermore, the magnetic attraction device provided between the flap 171 and the magnet 176 limits the maximum extraction effort. If for any undetermined reason an object or a box were to become jammed within a compartment, the flap 171 carrying the push-rod would become detached from the magnet and would withdraw by passing beneath the container, thus preventing any damage to the box, to the container, to the extractor 96 or to the conveyor belt 95 to which said flap is attached.

FIG. 14 shows the push-rod 148 which has been reversed as a result of an excessive extraction effort at the moment of engagement on the end pulley 101.

It is apparent from the FIGURE that the device as thus constructed have a natural tendency to revert to its normal position with the flap 171 applied magnetically against the magnet 176.

Figure 15:
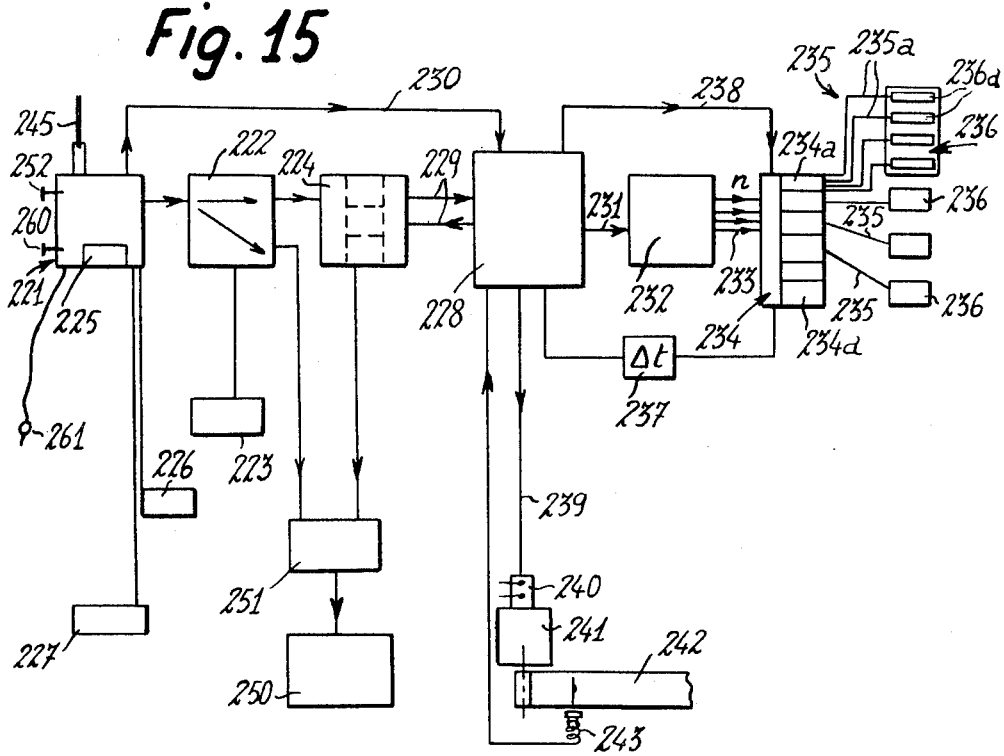
FIG. 15 is a constructional diagram of the electronic control arrangement of the system in accordance with the invention as applied to the storage of FIG. 8.

FIG. 15 shows diagrammatically the device for controlling the automatic distribution assembly for automated control of the stock and semi-automatic replenishment in the case of a system comprising a movable container. A control console 221 comprising an alphanumeric keyboard 225 drives a coder 222 which is in turn connected to a code-modification device 223. The output of the coder 222 drives an electronic memory 224 which is so designed as to store the coded data derived from the keyboard 225. Secondary keyboards 226 and 227 can be connected to the control console 221. A sequential logic unit 228 is connected on the one hand to the memory 224 by means of a double forward and return channel 229 and is connected on the other hand to the console 221 by means of a connection 230 which is intended to give the start-up order.

The logic unit 228 is coupled to a power switch 232 by means of a multiple linkage 231. Said switch is adapted to produce electric power pulses which are capable of supplying the different magnetic circuits of a linear motor by means of low-current pulses produced by the logic unit.

The switch 232 supplies a switching unit 234 by means of a number of phases such as 233 corresponding to the number of magnetic circuits or groups of magnetic circuits contained in a motor. By way of example, said unit can be a transistorized controlled-coupling electronic device. The switching unit 234 is connected by means of a number of relays 234a and wire linkages 235 corresponding to the number of linear motors 236 installed in the distribution assembly. Each linkage 235 comprises a number of wires 235a corresponding to the number of groups of magnetic circuits such as 236a within the linear motor 236 to which said linkage is connected. Moreover, a direct line link 238 connects the logic unit 228 to the switching unit 234 so as to initiate directly the closure of any given switching relay 234a. For the operation of the linear electromagnetic motor concerned, said direct line link thus defines the movable container in which the object to be distributed is present. The logic unit 238 is also connected to the switching unit 234 by means of another linkage comprising a safety time-control stage 237.

The logic unit 228 also drives by means of a wire linkage 239 the contactor 240 of a drive motor 241 of a conveyor-belt 242 which is shown diagrammatically, the motor 241 being supplied with electric power by means which are not shown in the drawings.

A detector 243 is so arranged as to detect the passage of the extractor and of the object extracted. Said detector can be either of the magnetic type or of the photoelectric-cell type or of the inductive-effect type. By means of a wire linkage, said detector delivers information to the logic unit 228 so as to indicate that the extraction has in fact been performed.

FIG. 15 additionally shows control means which are incorporated with the system in accordance with the invention. A printer 250 is connected by means of an interface stage 252 to the memory 224 and to the coder 222 in such a manner as to ensure that the printer can print all the indications given manually by the keyboards 225, 226 and/or 227.

Similarly, by means of coded information entered manually on one of the keyboards, the printer 250 can receive the real state of the stock memorized within the memory 224 and the definition of the original stock.

Figure 16:
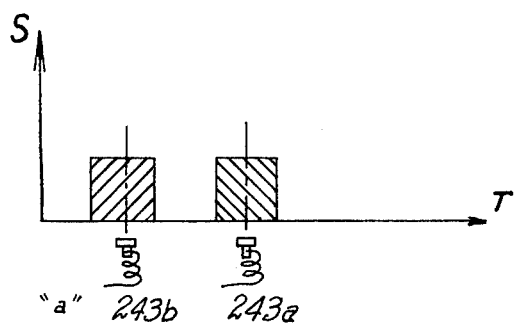
FIG. 16 is an explanatory diagram showing the operation of the device for controlling the withdrawal of objects.

It will be possible in some cases to make use of two detectors 243a and 243b, the output signals of which are represented as a function of time T in the diagrams of FIG. 16. Said detectors are placed at a distance from each other which ensures that they will be activated one after the other without any period of overlap if the extractor alone passes in front of said detectors (FIG. 16, diagram "a") and that they will be activated with a period of overlap if the extractor is accompanied by an object (FIG. 16, diagram "b"). In consequence, if none of the detectors is activated, this will mean that the ejector has moved to the position of release and that an incident has therefore occurred at the moment of extraction (jammed box).

If the two detectors are activated one after the other without any period of overlap, this will mean that the ejector has moved to the set position but unaccompanied by any product and that there was therefore no object to be extracted from the compartment, either because this compartment is empty or because the objects are not placed in the extraction position.

If both detectors are activated with a period of overlap, this will mean that an object has passed.

The operation of the device described with reference to FIG. 15 is as follows:

A request for objects comprising a plurality of objects and a plurality of units of any given object is given in alphanumeric form to one of the keyboards by the operator. In the event that two or even three operators were each to employ one of the keyboards 225, 226, 227, provision is made for a circular-permutation logic device for the utilization of information stored in the memory. The coder 222 receives the data given in plain by the keyboards and converts these latter in accordance with a predetermined code. Taking into account the progressive variation in the nature of the objects to be stored such as names, for example, provision is made for the possibility of producing action on the coder by means of the device 223.

The coder 222 transmits to the memory 224 all the data obtained from the keyboards in coded form into portions of memory which are reserved for each keyboard. Moreover, the memory had previously been loaded with the real stock which had originally been placed within the containers with the compartment address of the container and of the module and quantity in respect of each stack of stored objects.

Alternatively, said memory had access to another memory loaded with the address of the compartment, the container and the module in which the requested object is located.

The compilation of data at the outset is introduced by the main keyboard which has a key 252 for establishing a connection by means of the coder 222 to the portion of memory which is reserved for the original stock.

The requested information thus recorded is compared with the original memory which makes it possible to detect the address corresponding to the requested object and also serves to establish whether the real state of the stock satisfies this request.

In fact, as will be seen later, any object withdrawal is deducted from the memory so as to give the "real stock".

The memory 224 in which is stored the request for object distribution can produce action on the control logic unit 228 provided that the permission is introduced at the input of the logic unit by means of the direct connection 230 which connects the console 221 to the logic unit 228. Said connection 230 introduces the service circular permutation of each keyboard on condition, however, that these latter are in action and in position of the extraction request function.

The cycle of operation is then controlled by the logic unit which receives the address of the element from the memory 224 in coded form. A first portion of the information defines the container to be displaced, a second portion of the information contains the definition of the compartment of the element to be extracted in the form of binary numbers (or other numbers) which indicate the number of steps to be performed by the linear electromagnetic motor in order to obtain the coherent relative displacement of the extractor from which one or a number of objects are to be withdrawn.

The logic unit 228 possesses a decoder which makes it possible to convert the coded indications (binary or other indications) relating to the number of the container and therefore relating to the switching relay to be closed such as the relay 234a and initiates the closure of the switch by means of the multiple wire linkage 238. The same decoder which is included in the unit 228 converts the binary address corresponding to the compartment from which the object is to be withdrawn to a number of pulses corresponding to the number of steps to be performed by the electromagnetic linear motor in order to attain the desired relative position.

The logic unit then delivers the pulse orders to the power switch 232. The number of these orders is N. The power switch then produces the high-current pulses which are equal in number to M/n in the case of each of the phases of the motor which ae phase-shifted by $2\pi/m$, where $m$ is the number of magnetic circuits or groups of magnetic circuits of each linear motor.

When the pulses have been produced, the motor has thus placed the extractor and the container in the correct relative position of extraction of the object or of the objects requested. The extractor start order is given by the logic unit 228 through the intermediary of the direct connection to the contactor 240 of the motor 241 of the conveyor belt 242. The logic unit receives through the detector 243 the indication of the number of extractor operations and allows said extractor to remain in operation until the moment of coincidence between the number of objects requested, the number recorded in the memory and transmitted to the logic unit and the number of extractions performed and detected by the detector 243.

When the extraction-discharge operation has been completed, the logic unit again gives the number of pulses which are necessary in order to effect closure of the container. The operation at the time of closure is identical with the operation at the time of opening in regard to the number of steps, that is to say the number of pulses produced. The "high-current" pulses which will be supplied to the electromagnetic circuits are given in the direction opposite to the opening direction.

It will be readily understood that the signal for the end of operation corresponding to the objects extracted from any one compartment is applied as feedback to the memory 224. The corresponding number of elements extracted is then deducted from the real-stock memory.

There is also shown in FIG. 15 a supply point 245 for connecting a telecommunication means known as "Telex" which could provide the distribution control information in accordance with the invention. A number of safety devices have been included in the system, especially the time-control stage 237 which limits the operating time of a motor to the normal maximum operating time and to a value below a period which would adversely affect the thermal resistance of the motor windings as would be liable to occur, for example, if said motor remained on load as a result of any jamming of the open container. The opening position is advantageously defined by maintaining a mean current within two electromagnetic circuits which work in opposite tension.

Provision is made for a process of semi-automatic or "directed" replenishment by making use of the combined means described, by preventing the operation of the extractor alone by means of a key 260 of the control console 221 and by employing a manual control button 261 for initiating reclosure of the drawer.

The mode of procedure is as follows: the list of objects to be stored in quality and in number is struck on the alphanumeric keyboard 225; the relative container-extractor movements are initiated address by address and in the order of striking on the keyboard; the opening of the drawer-type container or the displacement of the extractor to a point opposite to the stationary container indicates the compartment in which the objects of the category considered are to be placed. When the operation has been completed and the manual control button (which is a movable element connected by a flexible wire to the console or to the module) has been actuated by the operator, the device reverts to the closed position for the movable container or to the original position for the stationary container and the movable extractor; from this moment, the logic unit 228 gives the operating order for the second object to be stored and so forth.

Figure 18:
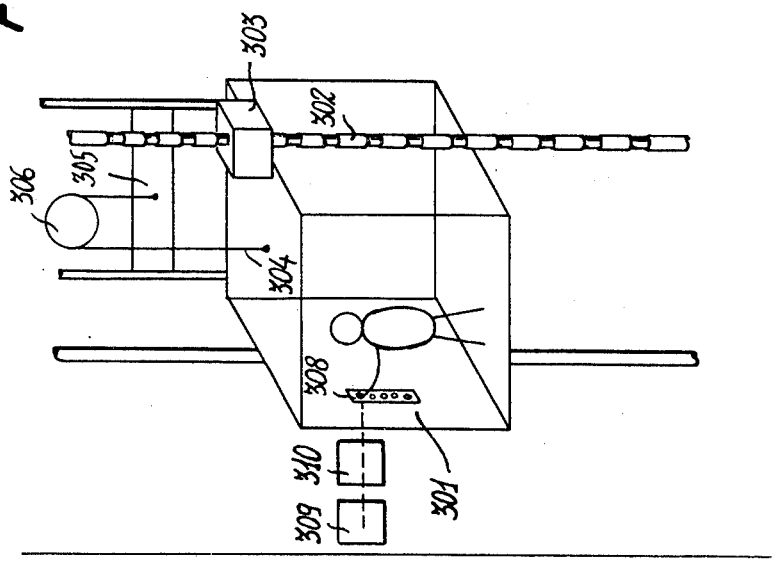
FIGS. 17 and 18 show the forms of construction of the device in the case of an elevator.
Figure 17:
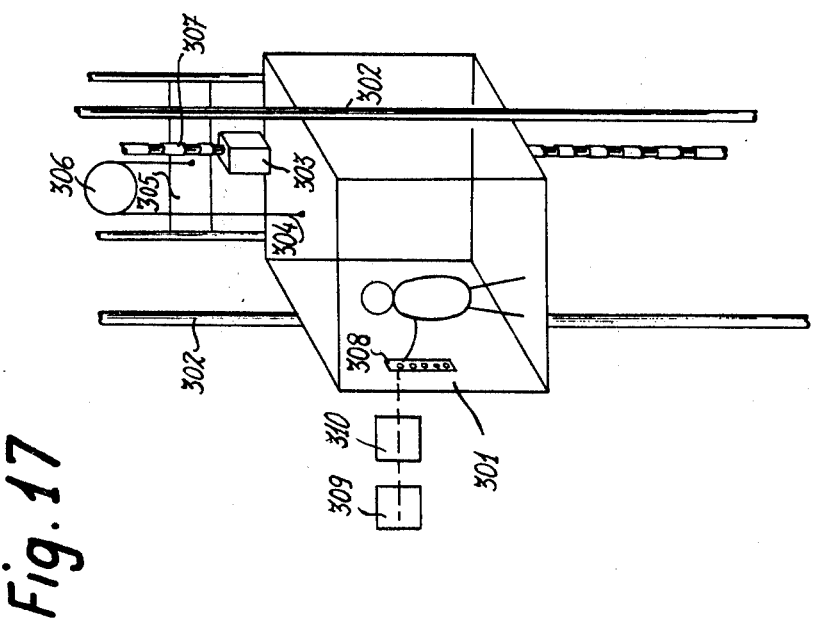

FIGS. 17 and 18 show the application of the device in accordance with the invention to an elevator. The assembly comprises an elevator cabin 301 guided by guiderails 302 and comprising a magnetizing assembly 303. A compensating cable 304 connects the cabin to the counterweight 305 by means of a guide pulley 306.

The magnetized portion 307 of the propulsion system is stationary and preferably located in the plane of symmetry of the guide-rails (as shown in FIG. 17). Said portion can also be incorporated with one of said guide-rails (as shown in FIG. 18).

The operation is as follows: by depressing a key 308 corresponding to the desired stage, the user initiates the operation of a programming device 309 which compares the desired stage with the position of the propulsion system at that time and emits the number of electrical pulses which are necessary in order to reach the desired stage.

The sequence is ordered in time by means of a regulator 301 so as to obtain a variation in acceleration and a uniform variation in deceleration of the cabin on each side of the constant-velocity paths.

The invention also applies to a system for horizontal transportation of persons (not shown) comprising either separate vehicles or vehicles coupled together in trains.

In applications of this type, accuracy of positioning of the moving portion of the propulsion system is less than 1/100 of the dimension of the vehicle in the direction of motion.

The output device is accordingly constituted by landing doors in the case of a lift or by the vehicle doors in the case of a horizontal transit vehicle.

Reference being made to FIGS. 19 and 20, there will now be described a particular form of linear stepping motor adapted to the movable storage drawers shown in FIG. 8 or FIG. 10. Said motor propels and positions the drawer to which it is connected in accordance with a program which is identical with that described earlier.

The motor which is connected to a drawer 162 and propels this latter by means of its front face 163 comprises a magnetized portion 161 and a stationary portion 164 placed on a frame 165 of the storage element.

The magnetized portion 161 is constituted by iron or mild steel sheet cut-out so as to form teeth 166 and recesses 167 forming magnetized sections; these sections can be filled with non-magnetic material such as plastic or light alloy or other suitable non-magnetic materials.

The sheet elements which are all identical are assembled so as to form a stack of sheets as shown in FIG. 20 and to provide the necessary thickness of iron for the passage of the magnetic flux. As shown in FIG. 20, the thickness of the magnetizing portion 164 is substantially equal to that of the magnetized portion 161.

The poles $P_1$, $P_2$, $P_3$, etc ..., up to $P_6$ for example in the case of a 3-phase motor are magnetized by coils $B_1$, $B_2$, etc ... so as to ensure that the pairs of coils $B_1$–$B_4$, $B_2$–$B_5$, etc... to which are applied programmed electrical pulses will give rise to circulation of flux such as $\phi_1$ or $\phi_2$, etc ... across the air-gaps and opposite to the poles $P_1$–$P_4$ and/or $P_2$–$P_5$, etc ...

These variable fluxes produce motive forces or braking forces when the magnetic reluctance is not of minimum value.

The relative arrangement of the poles of the circuits and of the magnetized sections is such that the ratio of the pitches of the poles $p_1$ to $P_2$, $P_2$ to $P_3$ and so forth, of the pitches of the successive teeth such as the tooth 166, is also equal to $(Kn \pm 1)/(n)$, with $n = 3$ and $k = 1$ in the example of FIG. 19.

This type of variable-reluctance motor having a programmed displacement as a result of the means of the present invention is advantageous in the case in which the mechanical structures make it possible without any appreciable deformation to absorb the electromagnetic attraction forces between the stationary portion and the moving portion of the motor.

Furthermore, said motor which has a greater longitudinal dimension can be employed when the character of overall length does not constitute any appreciable disadvantage. The motor as shown in FIG. 19 will preferably be employed with a limited number of poles.

I CLAIM:

1. An electromagnetic system for propulsion and programmed positioning for carrying out the displacement of objects in accordance with requirements and the control of said displacements, comprising a propulsion device formed by a magnetizing assembly and a magnetized assembly which are capable of moving with respect to each other, the magnetizing assembly being provided with at least one uniform row of N magnetic circuits fitted with inductance windings and having N poles or pairs of poles, a magnetized assembly provided with at least one uniform row of N' magnetic cores separated by non-magnetic sections and having a pitch which is different from that of the magnetic circuits, said system being further provided with a device for supplying electric power to the windings in the form of a sequence of unidirectional electrical pulses fed successively to said windings, wherein the ratio of pitch of circuits to pitch of cores is equal to $(Kn \pm 1)/(n)$, where $K$ and $n$ are whole numbers, wherein one of the two assemblies of the propulsion system is connected to a container which contains at least one object and the other assembly is connected to a device for withdrawing the object from the container, and wherein the system comprises an electronic device for the programmable control of said sequence, the program being such as to comprise a series of whole numbers of pulses such that each whole number corresponds to one stationary position of the propulsion and programmed-positioning device for placing the object-withdrawal device in oppositely-facing relation to the stored object to be withdrawn.

2. A system according to claim 1, wherein the container is stationary and the object-withdrawal device is connected to a moving assembly.

3. A system according to claim 1, wherein the container is movable and the object-withdrawal device is connected to a stationary assembly.

4. A system according to claim 1, wherein the magnetizable assembly is stationary and the magnetized assembly is movable.

5. A system according to claim 1, wherein the magnetizable assembly is movable and the magnetized assembly is stationary.

6. A system according to claim 1, wherein the relative unitary displacement corresponding to one pulse is substantially smaller than the dimension along the axis of motion of the compartment which contains the smallest object to be transported.

7. A system according to claim 6, wherein the unitary displacement is comprised between one-quarter and one-twentieth of the smallest axial dimension of an object-holding compartment.

8. A system according to claim 1, wherein said system comprises a code-modification device for modifying the series of whole numbers.

9. A system according to claim 1, wherein the container constitutes a device for storing objects in rows in a certain number of compartments.

10. A system according to claim 1, wherein the object-withdrawal device comprises an extractor for withdrawing the objects from the container.

11. A system according to claim 10, wherein the extractor comprises an extensible member of which one extremity comprises means for adhering to the object.

12. A system according to claim 11, wherein the extensible member is a bellows comprising means which tend to maintain said bellows in extension and wherein the adhering means comprise a suction element having an internal space which communicates with the internal space of the bellows, said bellows being intended to communicate with a vacuum pump by means of a control member.

13. A system according to claim 12, wherein the opening of the communication orifice between the vacuum pump and the bellows is larger than the opening of the communication orifice between the bellows and the suction element, the ratio of said openings being substantially equal to the ratio of the respective volumes of said bellows and said suction element.

14. A system according to claim 13, wherein said ratio is at least equal to 4.

15. A system according to claim 1, wherein said system comprises means for checking whether an object requested has been withdrawn by the extracting device.

16. A system according to claim 1, wherein the programmable control device comprises means for connecting with a data-processing device so arranged as to perform the operations involving control of displacements and stocks.

17. A system according to claim 1, wherein the container is the cabin of a system for transporting persons of the elevator or horizontal transit type comprising at least one vehicle.

18. A system according to claim 6, wherein the container is the cabin of a transportation system, wherein the unitary displacement is less than 1/100th of the dimension of the cabin in the direction of motion.

19. A system according to claim 9, wherein the device for the storage of objects is a sliding container provided with a row of storage compartments.

20. A system according to claim 10 in which the container constitutes a device for the storage of objects in a row in a certain number of compartments, wherein the storage device is stationary and the extracting device is movable.

21. A system according to claim 1, wherein the magnetizable assembly is attached to the stationary structure in a direction parallel to the direction of displacement of the container and wherein the magnetizing assembly which forms a unit is connected to the movable container.

22. A system according to claim 3 in which the magnetizable assembly is movable and the magnetized assembly is stationary, wherein said magnetizable assembly is connected to a movable container.

23. A system according to claim 10, wherein the extractor and/or the ejector is connected to the support for the magnetizable sections, said support being in turn capable of moving and guided by the stationary magnetizing circuits.

24. A system according to claim 1, wherein the assembly of magnetic cores of the propulsion system comprises at least one core in the form of a uniform cylinder having generator-lines at right angles to the direction of displacement.

25. A system according to claim 9, wherein at least one container is connectable and forms a single compartment.

26. A system according to claim 1, wherein said system comprises at least one coder with a manual control keyboard in order to initiate the process of transfer of at least one object.

27. A system according to claim 26,, wherein at least one coder comprises a wire-type remote-control input.

28. A system according to claim 26, wherein the coder is connected to the inputs of a sequential logic unit which delivers the operating orders.

29. A system accordng to claim 26 for initiating the process of replenishment, wherein said system comprises a manual control button for modifying the operation of the sequential logic unit.

30. A system according to claim 26, wherein said system comprises at least one electronic memory divided into at least two sections such that the first section which receives from the coder the information relating to the products to be distributed and the second section initially contains the addresses of the products which are stored in memory for reference.

31. A system according to claim 30, wherein the second section of the memory is modifiable by means of the manual control key.

32. A system according to claim 30, wherein the electronic memory drives the inputs of the operational sequential logic unit.

33. A system according to claim 28, wherein said system comprises a unit for switching electrical power, said unit being connected to the outputs of the operational sequential logic unit.

34. A system according to claim 32, wherein said system comprises an electric switching unit connected to the power-switching unit by means of a number of wire-linkages at least equal to the number of groups of magnetizing circuits of a propulsion system.

35. A system according to claim 34, wherein said system comprises a number of switching unit outputs corresponding to the number of groups of magnetizing circuits in the storage assembly.

36. A system according to claim 28, wherein said system comprises a printing machine for writing in plain the data introduced by the manual control keyboard and the coded data received by wire-type remote control.

37. A system according to claim 36, wherein said system comprises a connection between the memory and the printing machine in order to print in plain the real stock of the moment and details of stock replenishments.

38. A system according to claim 32, wherein said system comprises a wire linkage in order to control the transfer means after extraction of the product.

39. A system according to claim 10, wherein the extractor comprises an extraction effort limiter.

40. A system according to claim 39, wherein the effort limiter comprises means for adjusting the effort limit.

41. A system according to claim 39, wherein the extractor is adapted to cooperate with a conveyor belt so as to remove the object outside the storage module.

42. A system according to claim 41, wherein the extraction effort limiter comprises a permanent magnet.

43. A system according to claim 41, wherein the extractor is adapted to withdraw and remain withdrawn when the imposed extraction effort becomes greater than a predetermined limiting effort.

44. A system according to claim 43, wherein the extractor is adapted after withdrawal to return automatically into is operating position during part of the displacement of the conveyor belt.

45. A system according to claim 10, wherein the container face through which the extracted object is intended to pass is provided with at least one cut-out portion adapted to permit extraction of one object alone from a compartment and to retain the other stored objects in a stack within said compartment.

46. A system according to claim 45, wherein said container face comprises means for varying the size of said cut-out portion as a function of the dimensions of the objects contained in the compartments.

47. A system according to claim 9, wherein the compartments of the containers are adapted to be equipped with removable retaining memers so as to fill the space resulting from differences in dimensions of the compartments formed and of the objects to be placed within said compartments.

48. A system according to claim 1, wherein the containers are of different widths and said widths are multiples of a single module.

49. A system according to claim 48, wherein containers of different widths are adapted to be assembled on a universal frame so as to form modular elements of identical overall size.

50. A system according to claim 49, wherein the modules can be stacked and assembled so as to form furniture units of variable size.

51. A system according to claim 10, wherein the magnetizing circuits form a movable unit with the extracting device.

52. A system according to claim 51, wherein the movable unit is guided on the fixed support of the magnetizable sections.

53. A system according to claim 15, wherein the means for checking the withdrawal of the object comprise two detectors located at a distance from each other in the direction of displacement of the object so as to ensure that they are activated one after the other without any period of overlap is only the extractor passes in front of them and that said detectors are activated with a period of overlap if said extractor is accompanied by an object.

54. A system according to claim 1, wherein the magnetizing circuits of the magnetizing assembly are all located on one side of the magnetized assembly, wherein that face of the magnetized assembly which is located opposite to the magnetizing assembly is cut-out so as to from recesses, and wherein the ratio between the pitch of the magnetic circuits and the pitch of the recesses is equal to $(Kn \pm 1)/(n)$, where $K$ and $n$ are whole numbers.

* * * * *